No. 621,880. Patented Mar. 28, 1899.
H. E. WESTBY.
WHIFFLETREE AND SHAFT ATTACHMENT FOR VEHICLES.
(Application filed Mar. 16, 1898.)
(No Model.)
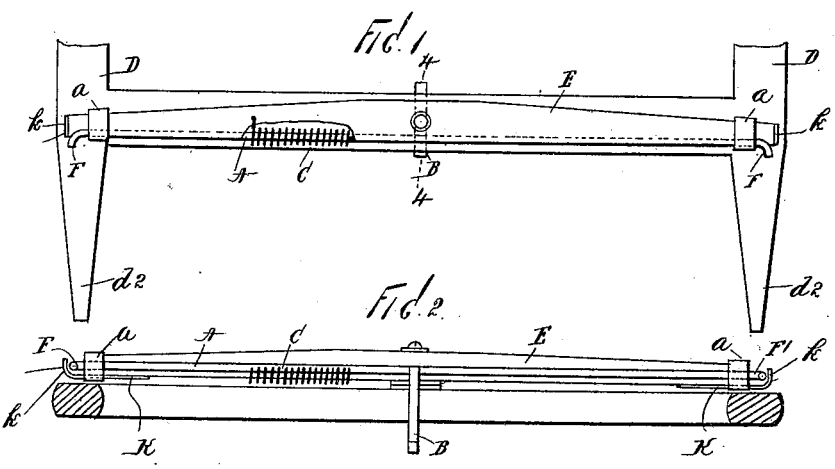
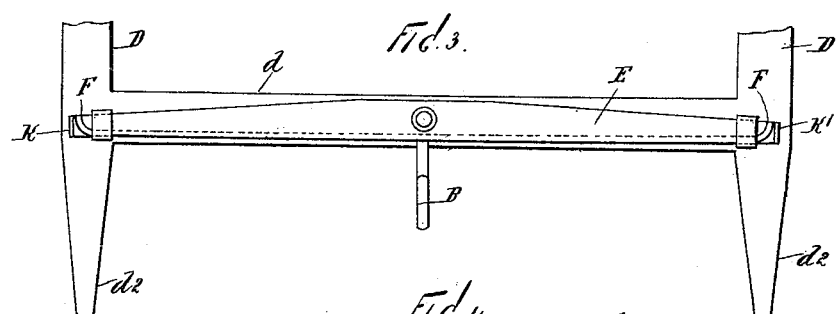
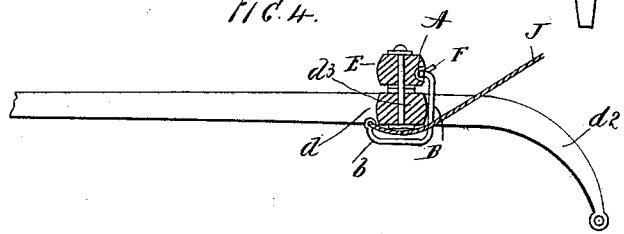
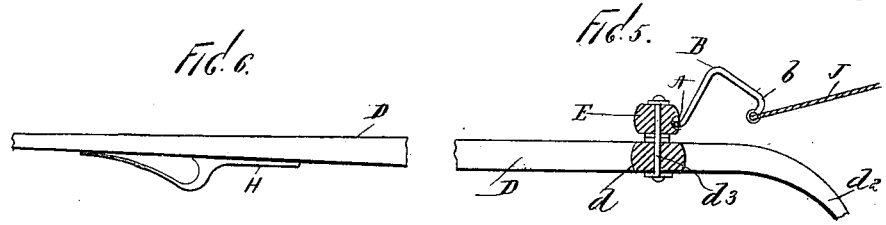
WITNESSES
John Buckler,
C. C. Olsen.
INVENTOR
Hanson E. Westby
BY
Edgar Tate & Co.
ATTORNEYS

UNITED STATES PATENT OFFICE.

HANSON E. WESTBY, OF SPOKANE, WASHINGTON.

WHIFFLETREE AND SHAFT ATTACHMENT FOR VEHICLES.

SPECIFICATION forming part of Letters Patent No. 621,880, dated March 28, 1899.

Application filed March 16, 1898. Serial No. 674,130. (No model.)

*To all whom it may concern:*

Be it known that I, HANSON E. WESTBY, a citizen of the United States, residing at Spokane, in the county of Spokane and State of Washington, have invented certain new and useful Improvements in Devices for Detachably Connecting Horses with the Whiffletrees of Vehicles, of which the following is a specification, such as will enable those skilled in the art to which my improvement appertains to make and use the same.

The object of my invention is to provide improved means for connecting a horse with the whiffletree of a vehicle, whereby the horse may be detached from said whiffletree by a party sitting in the vehicle.

The invention is fully disclosed in the following specification, of which the accompanying drawings form a part, in which—

Figure 1 is a plan view of that portion of the shafts of a vehicle with which the whiffletree is connected and showing my improvement connected therewith, part of the construction being shown in section; Fig. 2, a rear view of the whiffletree and its attachments; Fig. 3, a view similar to Fig. 1, showing the operative parts of my improvement in a different position; Fig. 4, a section on the line 4 4 of Fig. 1, showing the parts of my improvement in their normal position; Fig. 5, a view similar to Fig. 4, showing the parts in the position they assume in disconnecting the horse; and Fig. 6 a side view of one of the shafts or a part thereof, showing a metal loop or hook connected with the lower side of the shaft and which serves as means for attaching the breech-straps of the harness.

In the drawings forming part of this specification, the separate parts of my improvement are designated by the same letters of reference in each of the views, and, reference being made to said drawings, I have shown at D parts of the shaft of a vehicle and at $d$ the cross-bar connecting said shafts on which the usual whiffletree E is placed, the shanks of the shafts, by means of which the latter are connected with the vehicle, being shown at $d^2$.

The whiffletree E is centrally and pivotally connected with the cross-bar $d$ by a vertical bolt $d^3$, which passes through said bar and through said whiffletree, and countersunk in the rear side of the whiffletree is a rod A, with which is rigidly connected an arm B, this connection being made centrally of the rod A and adjacent to the pivotal support of the whiffletree E. The arm B is composed of metal and extends downwardly across the bar $d$ and is provided with a forwardly and upwardly curved extension $b$, with which is connected a strap or rope J.

The whiffletree E is provided at each end with a spring K, secured to the bottom thereof and the ends of which project upwardly to form hooks $k$, which project slightly beyond the ends of the whiffletree, and connected on each end of the whiffletree is a ring or band $a$, through which the ends of the rod A project, and the ends of the rod A are curved backwardly to form hooks F, with which the trace-straps of the harness are connected, and the hooks $k$ serve to hold the ends of the trace-straps on the hooks F of the rod A, and when the rod A is turned, as hereinafter described, the trace-straps will slip off of the hooks F and the horse will be detached from the whiffletree.

In Fig. 6 I have shown at H a forwardly-directed hook with which the breech-straps of the harness are connected, and when the horse is detached from the whiffletree it will be apparent that the said breech-straps will slip out of the hooks H and the horse may walk out of the shafts, as will be readily understood.

Wound on the rod A, at one side of the pivotal support of the whiffletree, is a spring C, one end of which is secured to said rod and the other to the whiffletree, and the operation of this spring is to normally hold the rod A in the position shown in Fig. 1, in which position the hooks F at the end of said rod project backwardly and hold the trace-straps in connection therewith.

The strap or rope J is carried backwardly into the vehicle, and if at any time the horse should start to run a pull on the strap or rope J will turn the rod A against the operation of the spring C and the hooks F at the ends of said rod will be directed forwardly and the horse will be detached from the vehicle, as hereinbefore described. When the pull on the strap or rope J is released, the rod A is returned to its normal position, as shown in Fig. 1, by the spring C.

This attachment may be applied, as will be readily understood, to vehicles having two whiffletrees and drawn by two horses, and said device is simple in construction and operation and perfectly adapted to accomplish the result for which it is intended, while being also comparatively inexpensive.

Having fully described my invention, I claim as new and desire to secure by Letters Patent—

1. A whiffletree for vehicles provided with rings or bands at the ends thereof, and a longitudinal groove in the back thereof, a longitudinal spring-operated rod $m$ mounted in said groove, and the ends of which project through said ring or band, and are provided with backwardly-directed hooks, and an angular arm secured to said rod centrally and curved downwardly and forwardly, said whiffletree being also provided with springs which are secured thereto at each end, and which are provided with hooks which operate in connection with the hooks at the ends of said spring-operated rod to hold the traces thereon, substantially as shown and described.

2. A whiffletree for vehicles provided with a longitudinal groove, and at each end with rings or bands, a rod mounted in said groove, and the ends of which project through said rings or bands and are provided with backwardly-directed hooks, a spring wound on said rod within said groove, one end of which is secured to said rod and the other to the whiffletree, a curved arm connected with said rod centrally thereof and provided with means for securing a strap to the free end thereof, and springs connected with the ends of the whiffletree and operating in connection with the hooks at the ends of the spring-operated rod for holding the traces thereon, substantially as shown and described.

HANSON E. WESTBY.

Witnesses:
K. G. MALMGREN,
C. J. CRAIG.